United States Patent [19]
Herbermann et al.

[11] Patent Number: 5,733,097
[45] Date of Patent: Mar. 31, 1998

[54] CROSS-BAR TOOL MOUNTING SYSTEM

[75] Inventors: Alfred F. Herbermann, Ann Arbor; Jacob J. Van't Land, Ypsilanti; Michael A. Filipiak, Ann Arbor, all of Mich.

[73] Assignee: Syron Engineering & Manufacturing Corp., Saline, Mich.

[21] Appl. No.: 353,920

[22] Filed: Dec. 12, 1994

[51] Int. Cl.⁶ .................................................. B25J 15/06
[52] U.S. Cl. ........................................ 414/752; 294/65
[58] Field of Search ................................ 414/749, 751, 414/752, 737; 294/65; 901/16

[56] References Cited

U.S. PATENT DOCUMENTS

| | | | |
|---|---|---|---|
| 3,542,412 | 11/1970 | Koch et al. | 294/65 |
| 4,648,786 | 3/1987 | Sakurai | 414/752 |
| 4,725,193 | 2/1988 | Sticht | 414/749 X |
| 4,957,318 | 9/1990 | Blatt | 294/64.1 |
| 5,024,575 | 6/1991 | Anderson | 414/737 X |
| 5,284,366 | 2/1994 | Herbermann et al. | 285/26 |
| 5,402,691 | 4/1995 | Dworkowski et al. | 414/749 X |

*Primary Examiner*—Donald W. Underwood
*Attorney, Agent, or Firm*—Howard & Howard

[57] ABSTRACT

A tool mounting frame incorporates a unique structure that secures the frame to a base at least at four points. The four-point connection ensures that the tool mounting frame will not move relative to the base. The frame has particular application in moving cross-bars, which are subject to vibration and stress from the weight of the parts they are moving. In a first embodiment, the frame incorporates two spaced locking portions that are interconnected by axially extending rails. The rails allow the mounting of tools at any location along the rail. The connection between the locking portions and the base includes pins at each lateral side of each of the forward and rear positions. In this way, a secure connection is provided. In a second embodiment, the four-point connection is provided by locking pins, and also by a roller fixed to the base which is received between two spring biased fingers. The spring biased fingers ensure that there will be no relative vertical movement between the roller and the frame, while ensuring a vertical clamping force. In another feature of this invention, an over-center handle is utilized to draw the frame into a locked position relative to the base. The inventive over-center handle has applications in structure other than that specifically disclosed in this application.

6 Claims, 2 Drawing Sheets

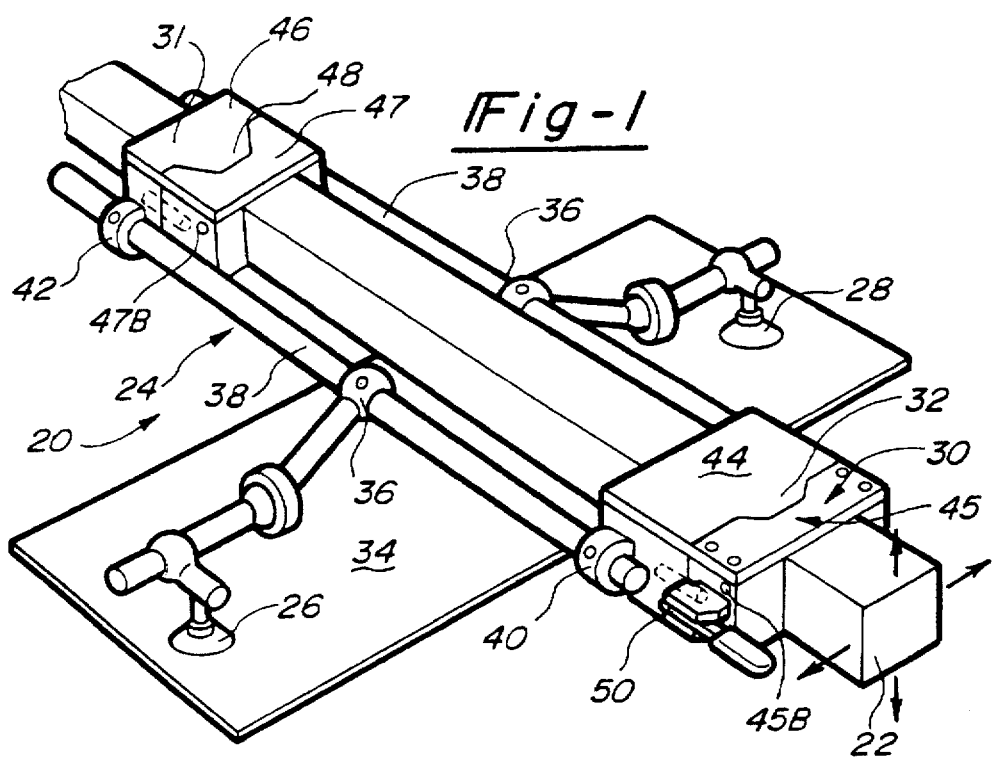
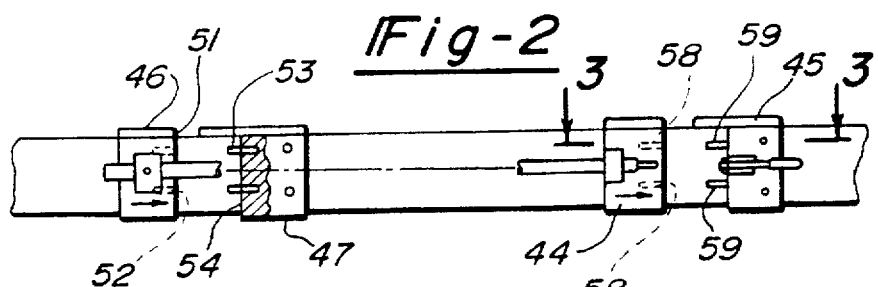
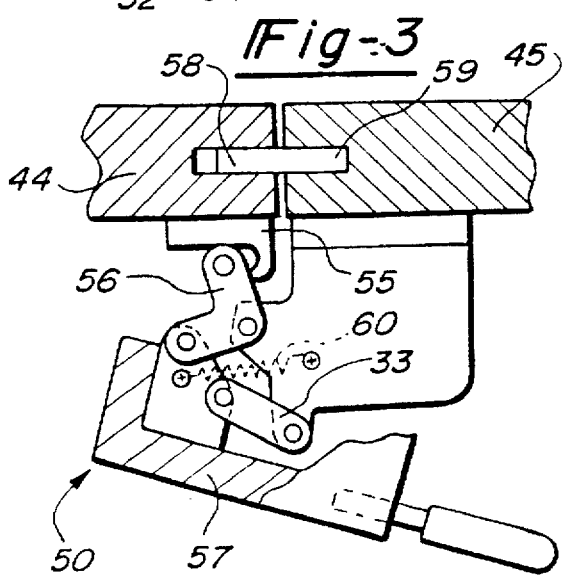
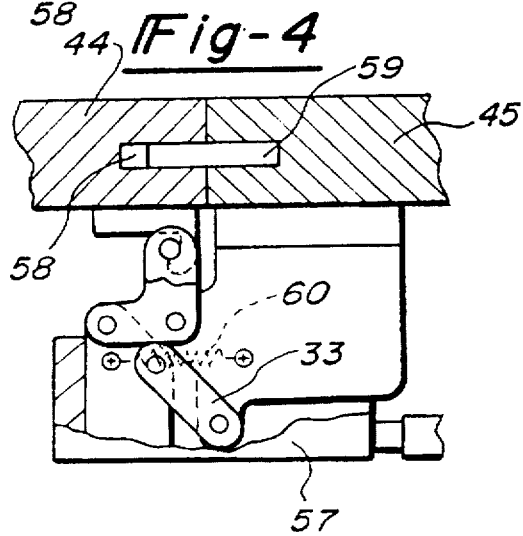

CROSS-BAR TOOL MOUNTING SYSTEM

BACKGROUND OF THE INVENTION

This invention relates to a system for securely mounting tools at adjustable locations on a base.

In the prior art, cross-bars are known which move a plurality of tools between different positions. The tools are often used to hold a part, and the cross-bar moves the part between various machining operations. As an example, the cross-bar may pick up a part at a first work location and move that part to a second work location.

In the prior art, heavy C-channel tool mounting systems are connected to the cross-bars. The C-channel members allow a tool to be fixed at pre-defined locations on the cross-bars. The prior art mounting systems have been somewhat deficient, in that they have not allowed adjustability in the location of the tool mounting relative to the cross-bar.

Moreover, the cross-bar is subject to a good deal of vibration and stress from the weight of the part. The prior art connection between the tool mounting system and the cross-bar has often not been adequate to overcome this vibration and stress. Rather, the prior art mounting systems have often moved relative to the cross-bar. When the mounting systems move, the tools and the part also move. This is undesirable.

Also, the prior art mounting systems, which included a solid C-channel member, have been relatively heavy and expensive. It would be desirable to decrease the weight and expense of those tool mounting systems.

Finally, with any tool mounting system, the ease of assembly is critical. In a factory setting, a tool mounting system cannot be overly complex or it runs the danger of being improperly connected. An ideal tool mounting system will be fool-proof. However, it has been somewhat difficult to provide such a system without sacrificing the integrity of the connection.

SUMMARY OF THE INVENTION

In disclosed embodiments of this invention, a tool mounting system is connected to a mount structure, such as a cross-bar, with a four-point connection. The four-point connection ensures that the mounting system will only move minimally relative to the cross-bar, even in the face of high vibration and weight stress. In a further main feature of this invention, the location of the tool relative to the mounting system is adjustable. In this way, an assembler may easily tailor the location of the tools to correspond to desired locations.

In preferred embodiments of this invention, the adjustability is provided by axially extending rails which are fixed to ends of the mounting system. The tools are mounted on clamps which can be fixed at any location along the rails. By selecting a desired location, and fixing the rail at that location, the location of the tool at an infinite number of axial locations can be achieved.

In a most preferred embodiment of this invention, the rails connect forward and rear locking portions of the mounting system. There is not a solid C-channel frame member as in the prior art in this embodiment. In this way, the lightweight feature of this invention is achieved and maximized. In addition, by eliminating much of the bulk of the prior art channel member, this embodiment achieves a better connection, since the majority of its mass is directly adjacent the four connection points.

In a further most preferred embodiment of this invention, the forward and rear locking portions have a wedged shaped configuration that interfits into corresponding wedge-shaped configurations on locking portions mounted to the cross-bar. In this way, the mounting system is properly and quickly guided onto the cross-bar when it is being attached. Further, the wedge-shaped configuration ensures that there will be minimal movement between the mounting system and the cross-bar.

In a further preferred feature of this invention, the forward and rear locking portions on the mounting system and the forward and rear locking portions on the cross-bar have a side pin and sleeve connection to ensure the solid connection of the two members. The side pins are preferably formed on both sides of one of the locking portions at both the forward and rear ends. In this way, the four-point connection described above is achieved. The side pins resist relative movement.

In a further preferred feature of this invention, the locking portions associated with the mount system are brought into a locked position on the locking portions on the cross-bar by an over-center handle. The over-center handle preferably includes a first toggle that catches a lip fixed to one of the locking portions on the mount system, thus drawing the locking portions on the mount system into the locking portions on the cross-bar. At the same time, the side pins are brought into their respective sleeve openings, ensuring the complete and sturdy connection of the mounting system on the cross-bar. The over-center handle ensures a fool-proof and quick connection.

In a second embodiment of this invention, the mounting system includes a C-shaped channel extending between the forward and rear portions, with locking portions on both sides of the C-shaped channel at forward and rear positions. The forward positions preferably include side pin connections such as described above. The locking portions at the rear end include spring-biased fingers fixed to the mounting system. Those fingers are spring-biased against a roller fixed to the side of the cross-bar. When locking the mount system, the roller is brought between the fingers. The fingers have a strong spring bias creating a vertical force between the roller and the mounting system. In this way, it is ensured that the mount system is securely attached to the cross-bar, resisting any tendency to move vertically. In a most preferred embodiment of this invention, the tools are mountable at any of several adjustable locations. In one embodiment, a plurality of spaced mount locations are formed on a side of the mounting system. In another embodiment, a rail is fixed to a side of the mounting system, and tools may be attached with a clamp to the rail at any desired location, as described above.

The combined mount systems of this invention are disclosed for use in a moving cross-bar. It should be understood, however, that the inventive mounting systems would have application in a fixed mount system. The inventive mounting systems provide a secure connection for a tool mount to a base, overcome vibration, and prevent relative movement between the mount system and the base. Moreover, the inventive mounting systems allow the adjustment of the location of the tools, thus providing valuable benefits relative to the prior art.

These and other features of the present invention can be best understood from the following specification and drawings, of which the following is a brief description.

BRIEF DESCRIPTION OF THE DRAWINGS

FIG. 1 is a perspective view of a first embodiment mount system.

FIG. 2 is a side view of the embodiment shown in FIG. 1.

FIG. 3 shows details of a handle incorporated into the embodiment of FIG. 1 in an unlocked position and along line 3—3 as shown in FIG. 2.

FIG. 4 shows the handle in the locked position.

DETAILED DESCRIPTION OF A PREFERRED EMBODIMENT

Figure 5:
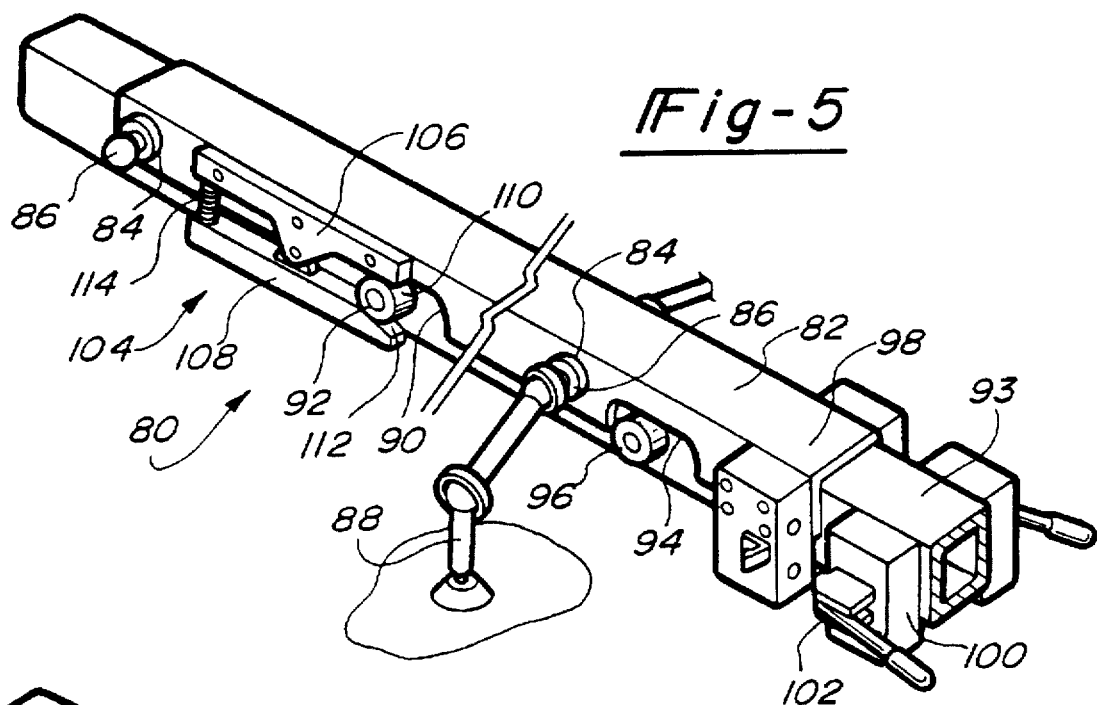
FIG. 5 is a side view of a second embodiment mounting system according to this invention.

FIG. 1 shows an inventive tool mount system 20 for use with a moving cross-bar 22. As shown schematically, cross-bar 22 is of the type which can move vertically and horizontally to reposition parts relative to various work stations. The mounting system 20 incorporates a frame 24 including a plurality of tools (here suction tools 26 and 28). The tools hold a part 34, and allow the cross-bar 22 to move part 34 as desired. As shown, clamp members 36 mount the tools to rails 38. The rails 38 extend between brackets 40 and 42 associated with a forward and rear end 30 and 31 of frame 24. It should be understood that rails 38 allow the mounting of the tools 26 and 28 at any axial location between forward end 30 and rear end 31. If needed, mounting tools 26 and 28 may be mounted on the other side of rear end 31. The infinite adjustability of the tools on rails 38 provides valuable benefits.

The frame 24 is securely attached to the cross-bar 22 by the forward locking portion 44 and the rear locking portion 46. As shown, forward locking portion 44 is abutting a forward locking portion 45 fixed to cross-bar 22. A bolt 45B is shown schematically to illustrate the fact that locking portion 45 is fixed to cross-bar 22. Similarly, a rear locking portion 47 is fixed to cross-bar 22 at bolt 47B.

Locking portion 30 includes a wedged shaped recess receiving a wedge 32 from forward locking portion 44. Similarly, a wedge member 48 associated with rear locking portion 46 interfits into a wedge-shaped recess on rear locking portion 47. When mounting frame 24 to cross-bar 22, the frame 24 is positioned slightly rearwardly from the locked position illustrated in FIG. 1. A handle 50, which is an over-center handle as will be described below, is then moved to a locked position. When handle 50 moves to a lock position it draws the frame 24 forwardly, or to the right, as shown in FIG. 1. The wedge 32 interfits into the recess in locking portion 45, and wedge 48 fits into the recess in locking portion 47. Thus, should frame 24 be slightly misaligned, the wedge shape will provide for any slight necessary adjustment. As will be described in greater detail below, when the locking portions 44 and 45 and 46 and 47 are connected, there are pins on their sides which securely hold the portions together at four points. The pins are formed on each lateral side of the locking portion connections, and at both the forward and rear positions. In this way, a four-point connection is provided. This four-point connection resists any relative movement due to vibration or stress from the weight of part 34.

As shown in FIG. 2, locking portion 47 carries a plurality of pins 53 on a side face 54. Pins 53 extend forwardly from side face 54, and when locked, into recess sleeves 52 formed on side face 51 of locking portion 46. It should also be understood that a similar pin connection would be formed on the opposed lateral side of the connection between locking portions 46 and 47. Although not shown, fluid electrical or vacuum connections could also extend through the locking portions.

Details of over-center handle 50 are shown in FIG. 3. Over-center handle 50 includes a locking lip 55 formed on forward locking portion 44. A first toggle 56 is placed rearwardly of lip 55 in the unlocked position as shown in FIG. 3. When handle portion 57 is moved to the lock position, as shown in FIG. 4, toggle 56 draws lip 55 and, consequently, locking portion 44, to the right, as shown in FIG. 3. The first toggle 56 and the second toggle 33 move, as shown, between FIGS. 3 and 4 to the lock position. The first toggle 56 moves the lip 55 in a direction to the right, as shown in FIGS. 3 and 4, and toward locking portion 45. This will draw the entirety of frame 24 to the locked position. As is known in over-center connections, a spring 60 is positioned within the over-center handle 50 to hold the handle at the two positions illustrated in FIGS. 3 and 4.

As also shown in FIGS. 2–4, a pin 59 fits into a recess sleeve 58 associated with the forward locking portion 44. A similar pin connection is formed on the opposed lateral sides of the forward locking portions. Thus, the pin connections at the two lateral sides and at the forward and rear end, provide a four-point connection resisting any relative movement due to vibration or weight stress.

As shown in FIG. 5, another embodiment 80 of the inventive frame incorporates a C-shaped channel member 82. A number of spaced mount locations 84 may be formed at discrete spaced locations on the side of the frame 82 to receive a connection 86 to a tool 88. The mount locations 84 may simply be a plurality of bolt holes to receive mount bolts from connection 86. Although only a few of the mount locations 84 are shown, it should be understood that they would preferably be spaced along the entire length of channel 82. The spaced mount location 84 allow the adjustment of the location of tool 88 relative to the frame 82. As also shown, a guide channel 90 is formed on the sides of the frame. A roller 92 is fixed to the side of the cross-bar 93 and received within guide channel 90. It should be understood that a similar roller and channel are formed on the opposed lateral side. A forward channel 94 also receives a roller 96. In the prior art, the rollers 92 and 96 were formed on the cross-bars 93, and moved within channels formed in the prior art mount system. The present invention utilizes the rear roller 92 to provide two of the inventive four-point connection points. A pair of pins and sleeves add the other two points at a forward end.

The forward end 98 of the frame 82 is connected to a locking portion 100, again with an over-center handle 102. A locking finger connection 104 includes a pair of fingers 106 and 108 which are pivotally connected. Locking finger 106 includes a flat surface 110 at a forward face, and locking finger 108 includes a ramp surface 112 at a forward face. The flat surface 110 and ramp surface 112 guide roller 92 between the locking fingers 106 and 108. A series of strong Belleville spring washers 114 bias the locking finger 108 towards the locking 106 finger. When the frame member 80 is being connected to the cross-bar 93 in this embodiment, the over-center handle 102 is moved to the locked position, drawing frame 82 to the right as shown in FIG. 5. Roller 92 moves relatively easily axially between the surfaces 110 and 112. However, no vertical movement will be allowed due to the flat surface 110 while a vertical clamping force is achieved due to the strong Belleville washers 114. Once the handle 102 is moved to its locked position it will also hold the frame member 82 at the desired axial location. Thus, there will be no relative movement of the frame 82 and the cross-bar 93.

Figure 6:
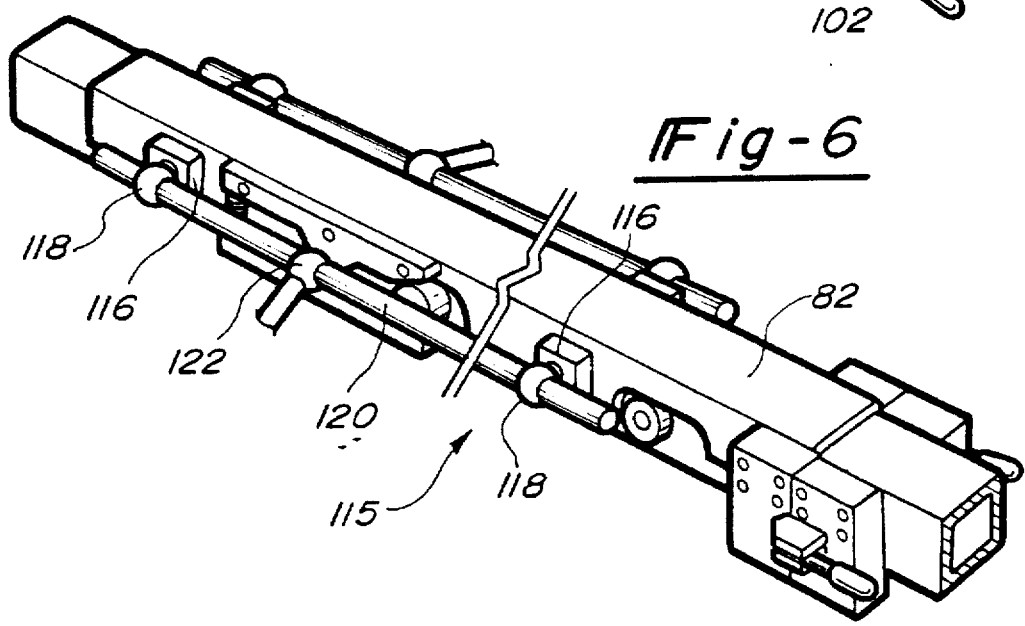
FIG. 6 shows an alternative side of the embodiment shown in FIG. 5.

As shown in FIG. 6, in an alternative embodiment 115, a pair of rail attachments 116 may be fixed to sides of frame 82. A pair of collars 118 may be associated with rail attachments 116. Rail attachments 116 may be simply bolted to the frame member 82. A rail 120 may extend between collars 118, and tools 122 may be mounted at any location along rail 120, as with the prior embodiment.

In the present invention, the four-point connection provided for either of the inventive frame embodiments ensures that the frame will be securely held to the moving cross-bar. At the same time, this invention and its inventive connections would have equal application in a fixed base for the tool mounting frames. Further, the adjustability provided by the inventive systems is a great improvement over the prior art systems.

The inventive over-center handle is specifically disclosed for moving mounting tool frames. It should be understood, however, that the inventive over-center handle would have applications in other types of mounting systems. As one example, the over-center handle may replace a handle such as shown for moving the two mounting members in the device disclosed and claimed in U.S. Pat. No. 5,284,366. A worker of ordinary skill in the art would recognize that the inventive over-center handle would have many other applications.

Preferred embodiments of this invention have been disclosed, however, a worker of ordinary skill in the art would recognize that certain modification would come within the scope of this invention. For that reason, the following claims should be studied in order to determine the true scope and content of this invention.

We claim:

1. A mounting system for mounting tools on a base comprising:

a movable base having a top and bottom and two lateral sides;

a tool mounting frame for selective attachment to said base, said tool mounting frame having a plurality of locations for mounting tools, and at least one tool being mounted on said frame;

means to fix said frame to said base, said means to fix including interconnecting portions of said frame and said base at forward and rear locations of said frame and said lateral sides of said base such that there is a four-point connection between said frame and said base preventing relative movement of said frame and said base;

said frame including a rail extending between said forward and rear positions, and means to fix said at least one tool at any of a plurality of locations along said rail; and said means to fix said at least one tool including clamps which may be fixed to said rail at any one of a plurality of locations between forward and rear positions on said rail, and wherein there are two of said rails, with one of said rails fixed to said frame at each lateral side of said frame, and at least one tool mounted on each said rail, there being clamps to fix said tools on said rails at any of a plurality of locations along said rails, and there being a quick release connection to allow release of said frame from said base by actuation of a handle to unlock a quick release locking structure.

2. A system as recited in claim 1, wherein the location of said at least one tool being mounted to said frame is adjustable between said forward and rear ends of said frame.

3. A system as recited in claim 1, wherein said interconnecting portions include a forward locking portion and a rear locking portion, said forward and rear locking portions being connected by said rails on each lateral side of said frame, with each of said rails allowing adjustment of the position of a tool along said rail.

4. A system as recited in claim 3, wherein said means to fix said frame and said base includes side pins associated with said forward and rear locking portions of one of said frame and said base, and corresponding openings formed in said locking portions of the other of said frame and said base, said pins being received in said openings in a locked position to define said four-point connection.

5. A system as recited in claim 4, wherein said handle moves said frame relative to said base between an unlocked position wherein said pins are not fully received in said openings and to a locked position wherein said pins are received in said openings and said frame is locked to said base.

6. A mounting system for mounting tools on a base comprising:

a movable base having a top and bottom and two lateral sides;

a tool mounting frame for selective attachment to said base, said tool mounting frame having a plurality of locations for mounting tools, and at least one tool being mounted on said frame;

means to fix said frame to said base, said means to fix including interconnecting portions of said frame and said base at forward and rear locations of said frame and on both lateral sides of said frame such that there is a four-point connection between said frame and said base preventing relative movement of said frame and said base;

rails extending along said frame between said forward and rear locations, and means to fix said at least one tool at any of a plurality of locations along at least one of said rails;

said frame including a forward locking portion and a rear locking portion, said forward and rear locking portions being connected by said rails, such that one of said rails is on each lateral side of said frame, with each of said rails allowing adjustment of the position of a tool along said rails; and said locking portions of said frame interfit into corresponding locking portions on said base, with said corresponding locking portions on said base and said frame including a wedge shaped configuration to guide said locking portions together to a fixed position.

* * * * *